US009233661B2

(12) United States Patent
Yamanaka et al.

(10) Patent No.: US 9,233,661 B2
(45) Date of Patent: Jan. 12, 2016

(54) OCCUPANT PROTECTION SYSTEM

(71) Applicant: TOYODA GOSEI CO., LTD., Kiyosu-shi, Aichi-ken (JP)

(72) Inventors: Takayuki Yamanaka, Kiyosu (JP); Yasushi Masuda, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/473,258

(22) Filed: Aug. 29, 2014

(65) Prior Publication Data

US 2015/0091283 A1    Apr. 2, 2015

(30) Foreign Application Priority Data

Sep. 30, 2013 (JP) ................................. 2013-204270

(51) Int. Cl.
| | |
|---|---|
| *B60R 21/18* | (2006.01) |
| *B60R 21/207* | (2006.01) |
| *B60R 21/231* | (2011.01) |
| *B60R 21/2338* | (2011.01) |
| *B60R 21/2346* | (2011.01) |

(52) U.S. Cl.
CPC ............... *B60R 21/18* (2013.01); *B60R 21/207* (2013.01); *B60R 21/231* (2013.01); *B60R 21/2338* (2013.01); *B60R 21/2346* (2013.01); *B60R 2021/23382* (2013.01)

(58) Field of Classification Search
CPC ...... B60R 21/18; B60R 21/207; B60R 21/26; B60R 21/261; B60R 2021/2612; B60R 2021/262; B60R 22/00; B60R 21/231; B60R 21/2338; B60R 21/2346; B60R 2021/23382
See application file for complete search history.

(56) References Cited

U.S. PATENT DOCUMENTS

| | | | | |
|---|---|---|---|---|
| 3,975,037 | A * | 8/1976 | Hontschik et al. ............ | 280/733 |
| 5,465,999 | A * | 11/1995 | Tanaka et al. .................. | 280/733 |
| 5,630,616 | A * | 5/1997 | McPherson ................ | 280/730.2 |
| 6,286,860 | B1 * | 9/2001 | Adomeit et al. .............. | 280/733 |
| 6,293,582 | B1 * | 9/2001 | Lewis .......................... | 280/735 |
| 6,378,898 | B1 * | 4/2002 | Lewis et al. ................... | 280/733 |
| 6,382,666 | B1 * | 5/2002 | Devonport .................... | 280/733 |
| 6,705,641 | B2 * | 3/2004 | Schneider et al. ............ | 280/733 |
| 6,715,788 | B2 * | 4/2004 | Saiguchi et al. ........... | 280/730.1 |
| 7,163,236 | B2 * | 1/2007 | Masuda et al. ............... | 280/733 |
| 7,600,780 | B2 * | 10/2009 | Tobata et al. ................. | 280/733 |
| 7,862,081 | B2 * | 1/2011 | Thomas ........................ | 280/733 |

(Continued)

FOREIGN PATENT DOCUMENTS

| | | | |
|---|---|---|---|
| JP | 2004-330903 A | | 11/2004 |
| JP | 2006-281967 A | | 10/2006 |

(Continued)

*Primary Examiner* — Laura Freedman
(74) *Attorney, Agent, or Firm* — Posz Law Group, PLC

(57) ABSTRACT

An occupant protection system includes a seatbelt device mountable on a vehicle seat and an airbag device mountable in a vicinity of a fastening area of the seatbelt device where a buckle section of the seatbelt device buckles a tongue. The airbag device includes an airbag inflatable between a lap belt, a shoulder belt and an occupant seated in the seat. The airbag includes a front inflatable section extending forward and a rear inflatable section extending rear- and upwardly. The rear inflatable section is so configured as to ride over a vicinity of the fastening area and contact the front inflatable section when an occupant of the vehicle moves forward and pushes the rear inflatable section at an impact on a vehicle from the front of the buckle section.

6 Claims, 15 Drawing Sheets

(56) References Cited

U.S. PATENT DOCUMENTS

| | | | |
|---|---|---|---|
| 7,866,690 B2 * | 1/2011 | Itoga | 280/733 |
| 8,282,126 B2 * | 10/2012 | Wiik et al. | 280/730.2 |
| 8,408,594 B2 | 4/2013 | Kibat | |
| 8,672,347 B2 * | 3/2014 | Schneider et al. | 280/733 |
| 8,882,138 B1 * | 11/2014 | Hicken et al. | 280/730.1 |
| 8,882,141 B2 * | 11/2014 | Arnold et al. | 280/733 |
| 2006/0290114 A1 * | 12/2006 | Suyama | 280/733 |
| 2008/0061538 A1 * | 3/2008 | Mohammad et al. | 280/730.2 |

FOREIGN PATENT DOCUMENTS

| | | | |
|---|---|---|---|
| JP | 2007223524 A | * | 9/2007 |
| JP | 2008-143273 A | | 6/2008 |
| JP | 2008-162545 A | | 7/2008 |
| JP | 2008-296722 A | | 12/2008 |
| JP | 2011005910 A | * | 1/2011 |

\* cited by examiner

OCCUPANT PROTECTION SYSTEM

CROSS REFERENCE TO RELATED APPLICATIONS

The Present application claims priority from Japanese Patent Application No. 2013-204270 of Yamanaka et al., filed on Sep. 30, 2013, the disclosure of which is hereby incorporated into the present application by reference.

BACKGROUND OF THE INVENTION

1. Field of the Invention

The present invention relates to an occupant protection system that includes a seatbelt device mountable on a seat of a vehicle and an airbag device mountable in a vicinity of a fastening area of the seatbelt device on the seat where a buckle section of the seat belt device buckles a tongue.

2. Description of Related Art

JP2008-143273 discloses a known occupant protection system including a seatbelt device and an airbag device located in a vicinity of a fastening area of the seatbelt device. In this occupant protection system, the airbag device is so actuated as to deploy an airbag over a body part of an occupant in a vicinity of the fastening area in a generally triangular shape as viewed from a side.

In the conventional occupant protection system, the airbag is designed to protect the pelvic area of an occupant seated in a vehicle seat mainly from a buckle section of the seatbelt device. However, the airbag at deployment does not extend over to the front and rear of the buckle section as viewed from a side, and therefore, still has a room for improvement in order to arrest the pelvic area and protect the occupant in the event of a partial overlap frontal collision in which an impact force acts from the front of the buckle section.

SUMMARY OF THE INVENTION

An object of the present invention is to provide an occupant protection system capable of protecting an occupant adequately with an airbag in the event of a partial overlap frontal collision in which an impact force acts from the front of a buckle section of a seatbelt device.

The object of the invention will be achieved by an occupant protection system including:

a seatbelt device mountable on a seat of a vehicle, including a lap belt, a shoulder belt, a tongue and a buckle section that buckles the tongue;

an airbag device mountable in a vicinity of a fastening area of the seatbelt device on the seat, at which fastening area the buckle section of the seatbelt device buckles the tongue; and an airbag of the airbag device inflatable with an inflation gas fed from an inflator and deployable between the lap belt, the shoulder belt of the seatbelt device and an occupant seated in the seat, the airbag including a front inflatable section that is so deployable as to extend forward from the vicinity of the fastening area at an inner side of the fastening area and a rear inflatable section that is so deployable as to extend rear- and upwardly from the vicinity of the fastening area at an inner side of the fastening area, the rear inflatable section being so configured as to ride over the fastening area and contact the front inflatable section such that a contact region of the rear inflatable section contacts and is supported by a support region of the front inflatable section, when an impact force acts in a diagonal direction from the front of the buckle section and the occupant moves forward and pushes the rear inflatable section.

In the occupant protection system of the present invention, the airbag of the airbag device is deployable between the lap belt, the shoulder belt of the seatbelt device and an occupant seated in the seat. The airbag includes the front inflatable section that is so deployable as to extend forward from the vicinity of the fastening area, where the buckle section of the seatbelt device buckles the tongue, at an inner side of the fastening area, and the rear inflatable section that is so deployable as to extend rear- and upwardly from the vicinity of the fastening area at an inner side of the fastening area. If the occupant moves diagonally forward in the event of a partial overlap frontal collision where an impact force acts on a vehicle diagonally from the front, i.e., from the front of the buckle section, the rear inflatable section is pushed forward along with the forward movement of the occupant. With the occupant protection system of the invention, the rear inflatable section then rides over the vicinity of the fastening area and contacts the front inflatable section. That is, the rear inflatable section having cushioned an upper body of the occupant laps over the front inflatable section while tucking the fastening area between the rear inflatable section and front inflatable section, and consequently, the airbag will be prevented from slipping out of the fastening area. Moreover, when the rear inflatable section contacts the front inflatable section, the contact region of the rear inflatable section is supported by the support region of the front inflatable section, and the airbag accordingly increases its thickness by the doubled inflatable sections. Thus the airbag will adequately arrest the pelvic area of the occupant and prevent the occupant from moving further forward. As a result, the occupant protection system of the invention will prevent an occupant from substantially moving diagonally forward and prevent him/her from slipping out of the shoulder belt which extends upward and toward an outboard direction from the buckle section located proximate to the seat.

Therefore, the occupant protection system of the invention will be capable of protecting an occupant adequately with an airbag in the event of a partial overlap frontal collision in which an impact force acts from the front of the buckle section of the seatbelt device.

Moreover, since the airbag of the occupant protection system of the invention includes the front inflatable section so deployable as to extend forward from a vicinity of the fastening area and the rear inflatable section so deployable as to extend rear- and upwardly from the vicinity of the fastening area, the airbag will cover a wide area of the lateral of an occupant seated in the seat, and therefore adequately protect the occupant at a lateral collision in which an impact force acts on a lateral of a vehicle.

The occupant protection system of the invention desirably includes inside the airbag an inner tube that guides an inflation gas fed from the inflator to the front inflatable section and rear inflatable section via a region of the airbag behind a vicinity of the fastening area. This inner tube will help inflate the front inflatable section and rear inflatable section quickly and will consequently help deploy the airbag between the lap belt, shoulder belt and an occupant extensively and quickly.

Further, it is desired that the seatbelt device of the occupant protection system includes a pretensioner mechanism and that a start of actuation of the inflator occurs after the start of actuation of the pretensioner mechanism.

With this configuration, the airbag will be inflated into a predetermined contour in a state where the lap belt of the seatbelt device has been brought into contact with the pelvic area of an occupant, not that the lap belt is pulled into contact with the pelvic area over the airbag that has been inflated. As a consequence, the lap belt will be prevented from being lifted away from the pelvic area of the occupant by the airbag as has been inflated, thus a large gap will not be formed between the lap belt and the occupant.

Moreover, it is desired that a buckle covering section of the airbag, which is deployable between a vicinity of the fastening area and an occupant, is so configured as to be depressed relative to its forward and rearward inflatable regions in the airbag at airbag deployment. This configuration will reduce the sectional area of the buckle covering section as inflated, and accordingly will further prevent the airbag from lifting the lap belt, and will facilitate the bending of the airbag about the buckle covering section when the rear inflatable section contacts the front inflatable section.

Specifically, the depressed contour of the buckle covering section can be made by forming the airbag of a pair or generally identical base cloths jointed together by outer circumferential edges; an occupant side wall deployable on a side of a vehicle occupant and an opposite side wall deployable on a side facing away from the occupant, and by providing a dent at an outer circumferential edge of a region deployable between the fastening area and the occupant in each of the occupant side wall and opposite side wall. Thus the buckle covering section as fully inflated will be reduced in dimension in an up and down direction and in sectional area relative to its forward and rearward inflatable regions.

Alternatively, the depressed contour of the buckle covering section may also be formed by providing a tether inside the airbag at a region deployable between the fastening area and an occupant so as to limit a clearance between the occupant side wall and opposite side wall as well as forming the airbag by jointing together outer circumferential edges of the occupant side wall and opposite side wall. With this configuration, the buckle covering section as fully inflated will be reduced in thickness and in sectional area relative to its forward and rearward inflated regions.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims. In the following description, front-rear, up-down and left-right directions are intended to refer to front-rear, up-down and left-right directions of a vehicle, unless otherwise specified.

An occupant protection system S embodying the present invention will be described here as is mounted on a front passenger seat PS.

Figure 1:
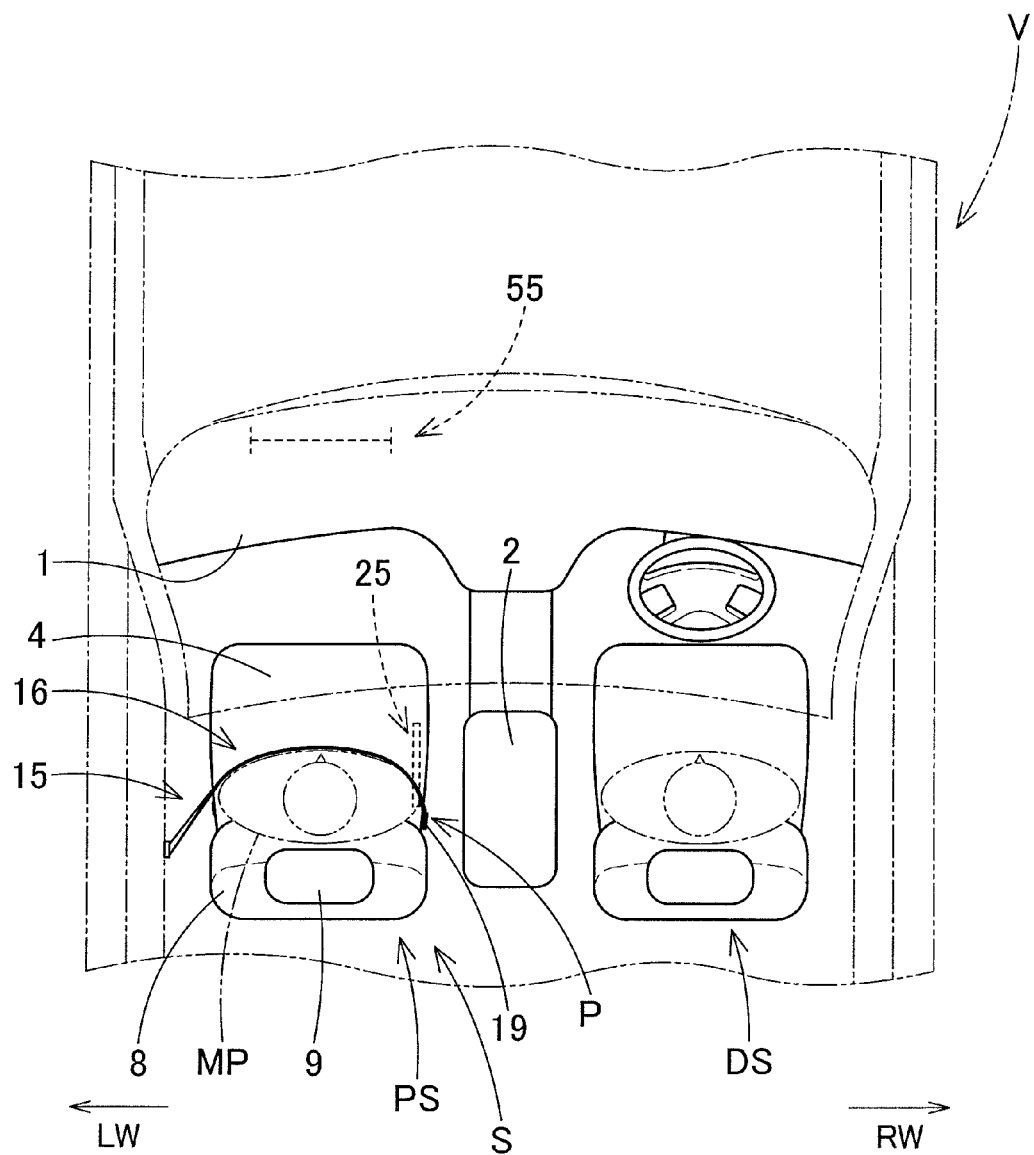
FIG. 1 is a schematic partial plan view of a vehicle on which an occupant protection system embodying the invention is mounted.
Figure 3:
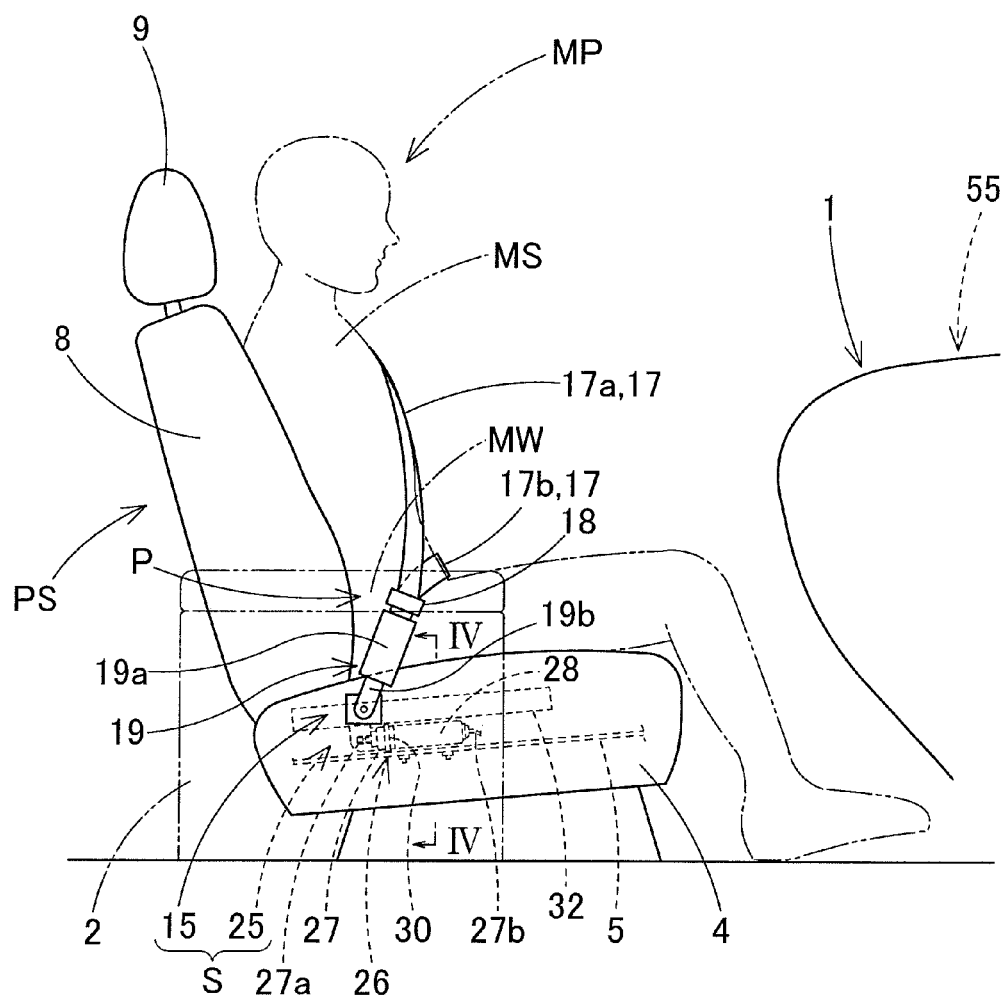
FIG. 3 is a side view of an airbag device of the occupant protection system of the embodiment.

As shown in FIGS. 1 and 3, the occupant protection system S includes a seatbelt device 15 mounted on the front passenger seat PS and an airbag device 25 located in a vicinity of a buckle section 19 of the seatbelt device 25 in the front passenger seat PS.

Figure 4:
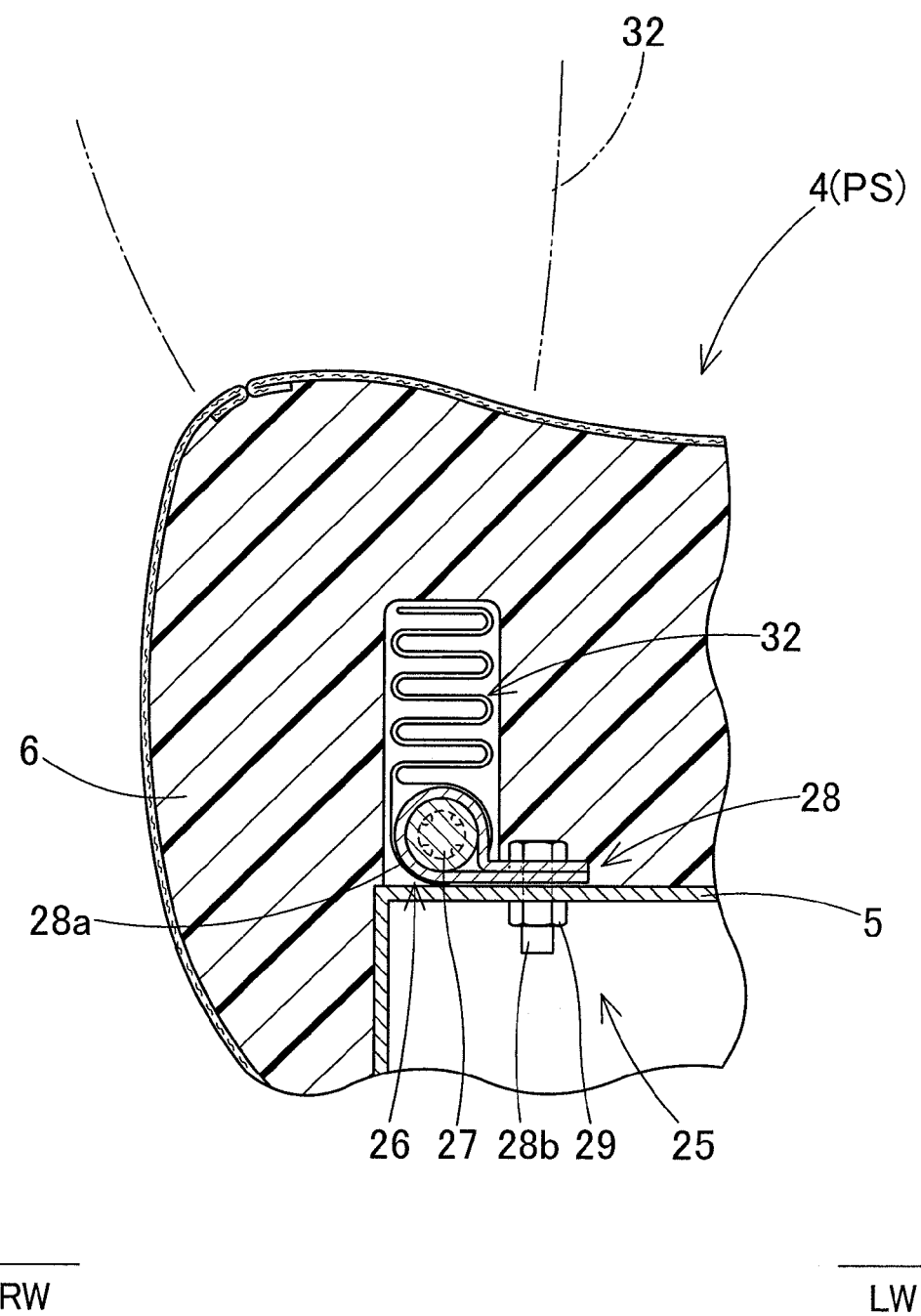
FIG. 4 is a vertical section of the airbag device of the embodiment taken along line IV-IV of FIG. 3.

As shown in FIGS. 1 and 3, the front passenger seat PS includes a seat 4, a backrest 8 extending upward from the rear end of the seat 4 and a headrest 9 protruding upward from the top of the backrest 8. As shown in FIG. 4, the seat 4 includes a seat pan 5 made of a sheet metal and a cushion 6 covering the seat pan 5. In this embodiment, the airbag device 25 is stored at a right rear end region of the seat 4 of the front passenger seat PS, in a vicinity of the buckle section 19 of the seatbelt device 15. A surface skin (reference numeral omitted) is arranged over an outer surface of the cushion 6. The surface skin is partially tearable together with the cushion 6 so as to allow the airbag 32 (or a bag body 33) to deploy upward at airbag deployment.

Figure 2:
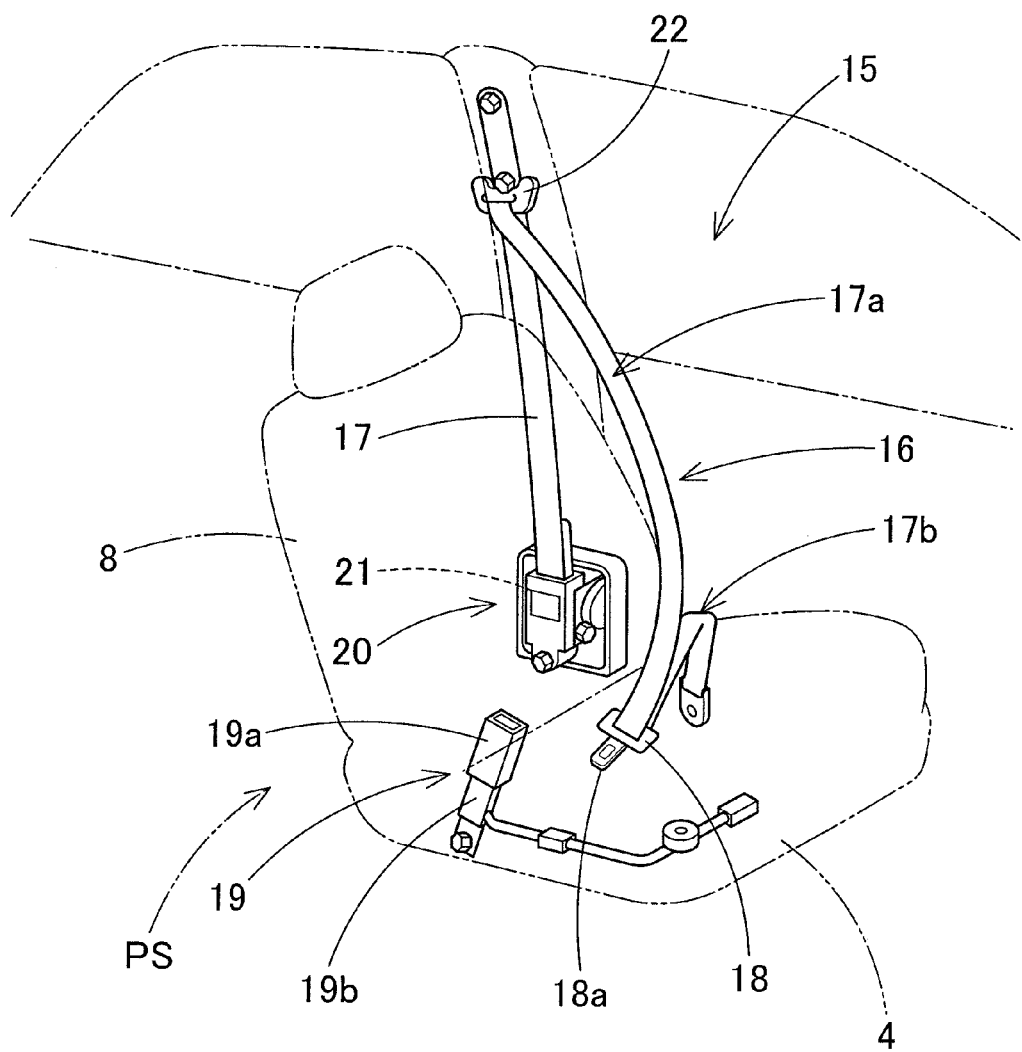
FIG. 2 is a schematic perspective view of a seatbelt device of the occupant protection system of the embodiment.
Figure 9:
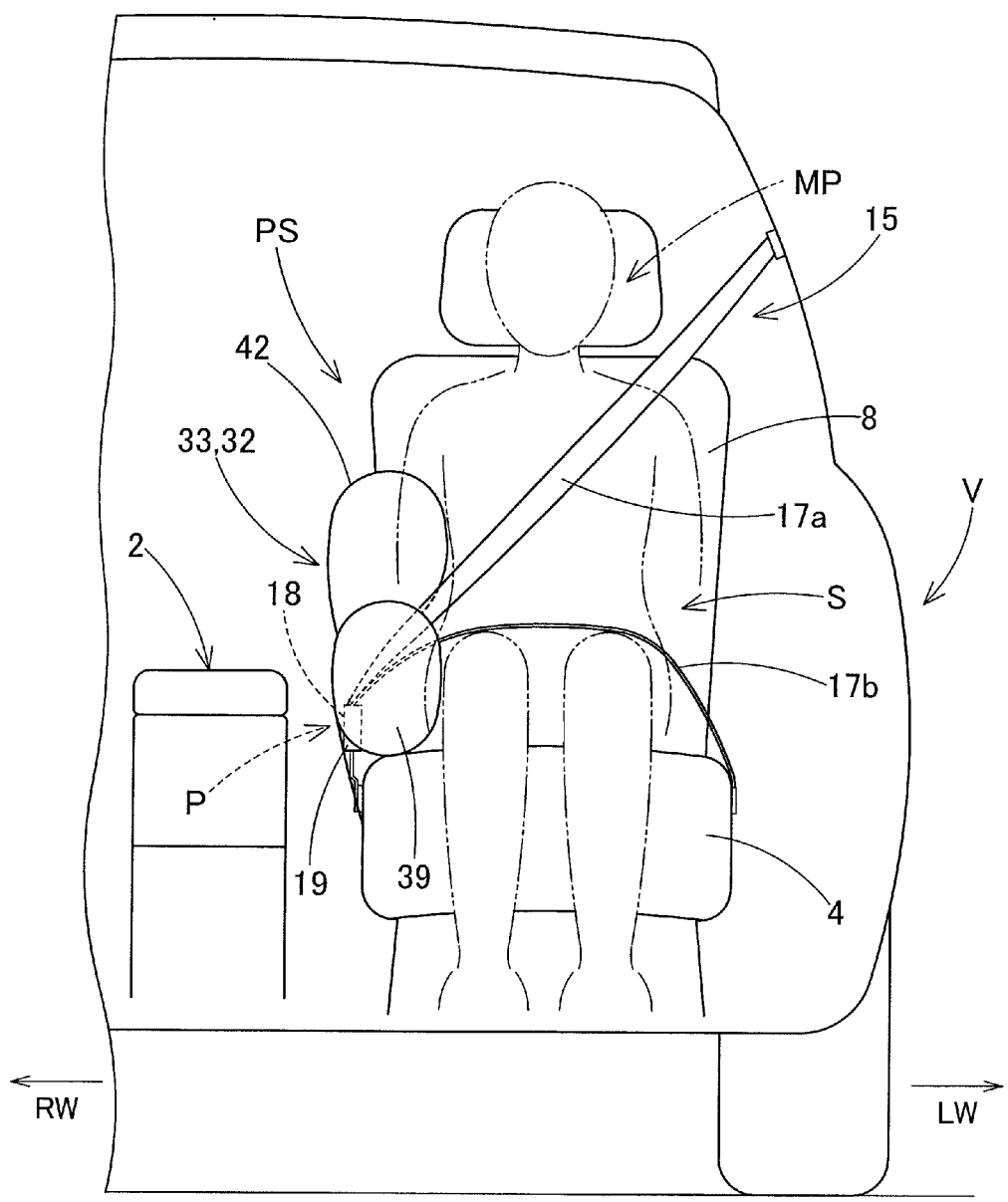
FIG. 9 is a schematic front view of the occupant protection system in operation, showing the airbag as fully inflated with the seatbelt fastened.

The seatbelt device 15 is a three-point belt device. As shown in FIG. 2, the seatbelt device 15 includes a belt section 16 for arresting an occupant MP seated in the front passenger seat PS, a buckle section 19 for engagement with a later-described tongue 18 of the belt section 16 and a reel mechanism 20 for reeling a later-described webbing 17 of the belt section 16. The belt section 16 includes a webbing 17 and a tongue 18 attached to the webbing 17 movably relative to the webbing 17. The first end of the webbing 17 is fixed to the vehicle body structure at the left side LW of the front passenger seat PS (i.e., on the vehicle body side) whereas the second end is connected to the reel mechanism 20 via an anchor 22 located above the headrest 9 on the left side of the front passenger seat PS. The tongue 18 is slidable along the webbing 17 and includes an engaging section 18a for engagement with the buckle section 19. As shown in FIG. 3, the buckle section 19 is located in a vicinity of the border between the seat 4 and backrest 8, i.e., at the rear end of the seat 4, on the right side of the front passenger seat PS. The buckle section 19 includes a buckling body 19a for receiving the tongue 18 and a mounting section 19b extending from the buckling body 19a to be mounted on the front passenger seat PS. The reel mechanism 20 is located on the left of the rear end of the seat 4 and is covered by an unillustrated interior material. The reel mechanism 20 reels in and winds up a loose webbing 17, and for that purpose includes a pretensioner mechanism 21 which is actuated in the event of a collision of the vehicle V. The pretensioner mechanism 21 includes an unillustrated gas generator which is electrically connected to an unillustrated operating circuit so it retracts the webbing 17 with a gas generated upon actuation. The seatbelt device 15 arrests an occupant MP seated in the front passenger seat PS by adjusting the length of the webbing 17 and shifting the position of the tongue 18 in accordance with the physical size of an occupant. A part of the webbing 17 from the anchor 22 to the tongue 18 serves as a shoulder belt 17a which extends obliquely and restrains an upper body of the occupant MP from the left shoulder to the right pelvic area, and a part of the webbing 17 from the tongue 18 to the fixed end of the webbing 17 fixed to the vehicle body structure serves as a lap belt 17b which extends in a left and right direction and restrains the pelvic area MW of the occupant MP (FIGS. 2, 3 and 9).

In this embodiment, a fastening area P of the seatbelt device 15 restraining an occupant MP in the passenger seat PS, where the buckle section 19 buckles the tongue 18, is intended to include the buckling body 19a, tongue 18 and regions of the shoulder belt 17a and lap belt 17b in a vicinity of the tongue 18.

As shown in FIGS. 1, 3, and 4, the airbag device 25 is located proximate to the buckling section 19 of the seatbelt device 15 (i.e., in a vicinity of the fastening area P where the buckle section 19 buckles the tongue 18 when the seatbelt device 15 is in use), in a vicinity of the right rear end of the seat 4 of the front passenger seat PS. The airbag device 25 includes an airbag 32 and an inflator 26 for feeding the airbag 32 with an inflation gas.

Figure 5:
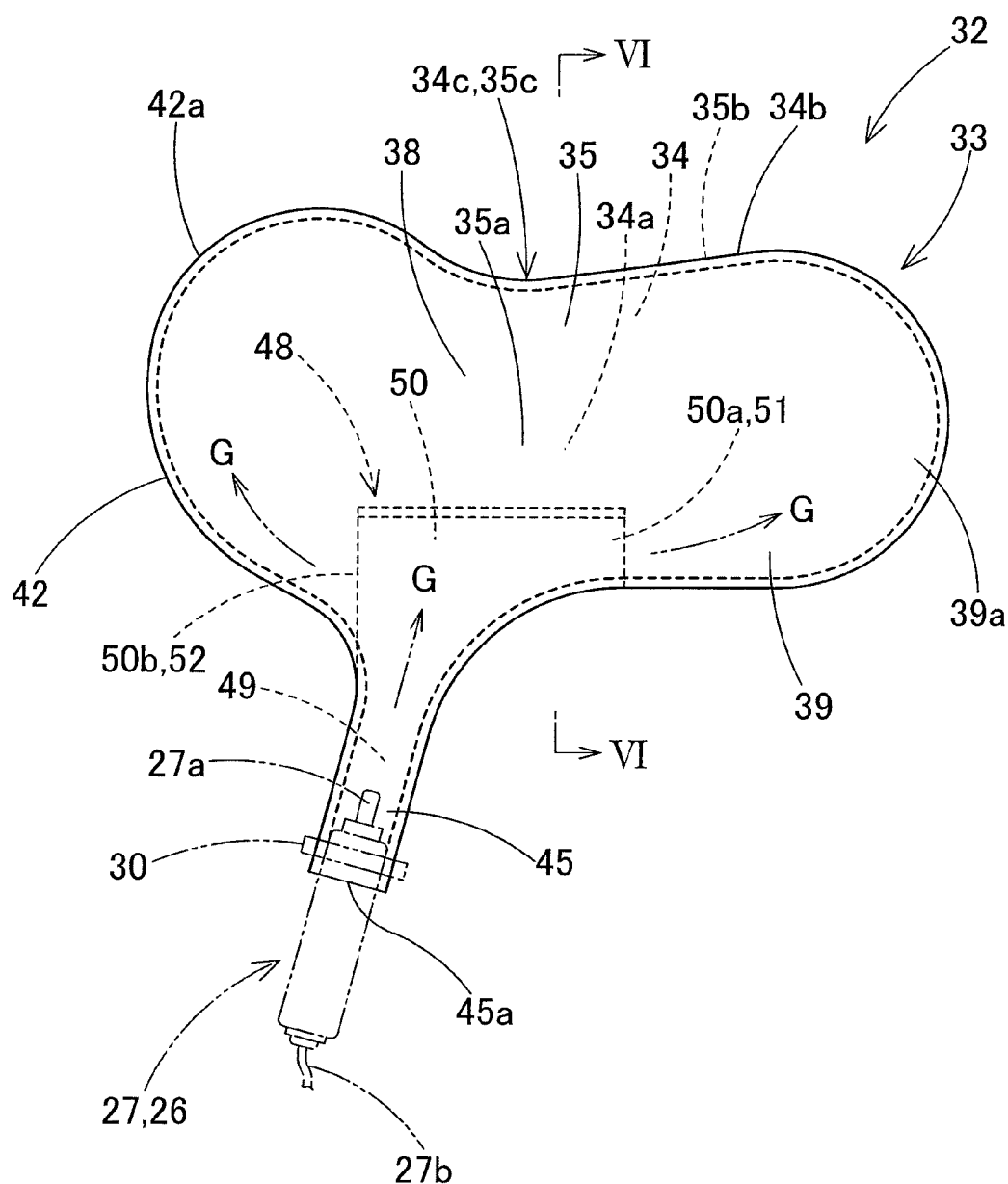
FIG. 5 is a side view of an airbag for use in the airbag device of the embodiment.

As shown in FIGS. 3 and 5, the inflator 26 is generally columnar in outer contour and is fixed to the seat pan 5, in this specific embodiment. As shown in FIGS. 3 and 4, the inflator 26 of this embodiment includes a generally columnar main body 27 and a mounting bracket 28 mounted around the main body 27. The main body 27 is so arranged that its axial direction extends generally along a front and rear direction, and includes at the rear side a small diameter region 27a having gas discharge ports (unillustrated) and a lead wire 27b which extends from the front end and is electrically connected to the operating circuit. In this specific embodiment, the rear region of the main body 27 including the small diameter region 27a having the gas discharge ports is inserted into a later-described connection port 45 of a bag body 33 of the airbag 32, and is coupled to the airbag 32 with a clamp 30 mounted around the connection port 45 (FIGS. 3 and 5). The mounting bracket 28 includes a holding section 28a holding the main body 27 of the inflator 26 and mounting bolts 28b protruding downwardly from the holding section 28a. As shown in FIG. 3, the mounting bolts 28b are located at two positions arranged along an axial direction of the holding section 28 (i.e., along a front and rear direction). The inflator 26 is fixed to the seat pan 5 together with the airbag 32 with the mounting bolts 28b which are nut 29 fastened to the seat pan 5 (FIG. 4). The inflator 26 of this specific embodiment is designed to be actuated slightly later than the unillustrated gas generator of the pretensioner mechanism 21 of the seatbelt device 15. More specifically, in the event of a partial overlap collision of the vehicle V or the like, the inflator 26 is to be actuated 10 ms after the actuation of the gas generator of the pretensioner mechanism 21, i.e., after the start of retraction of the webbing 17 by the pretensioner mechanism 21.

Figure 6:
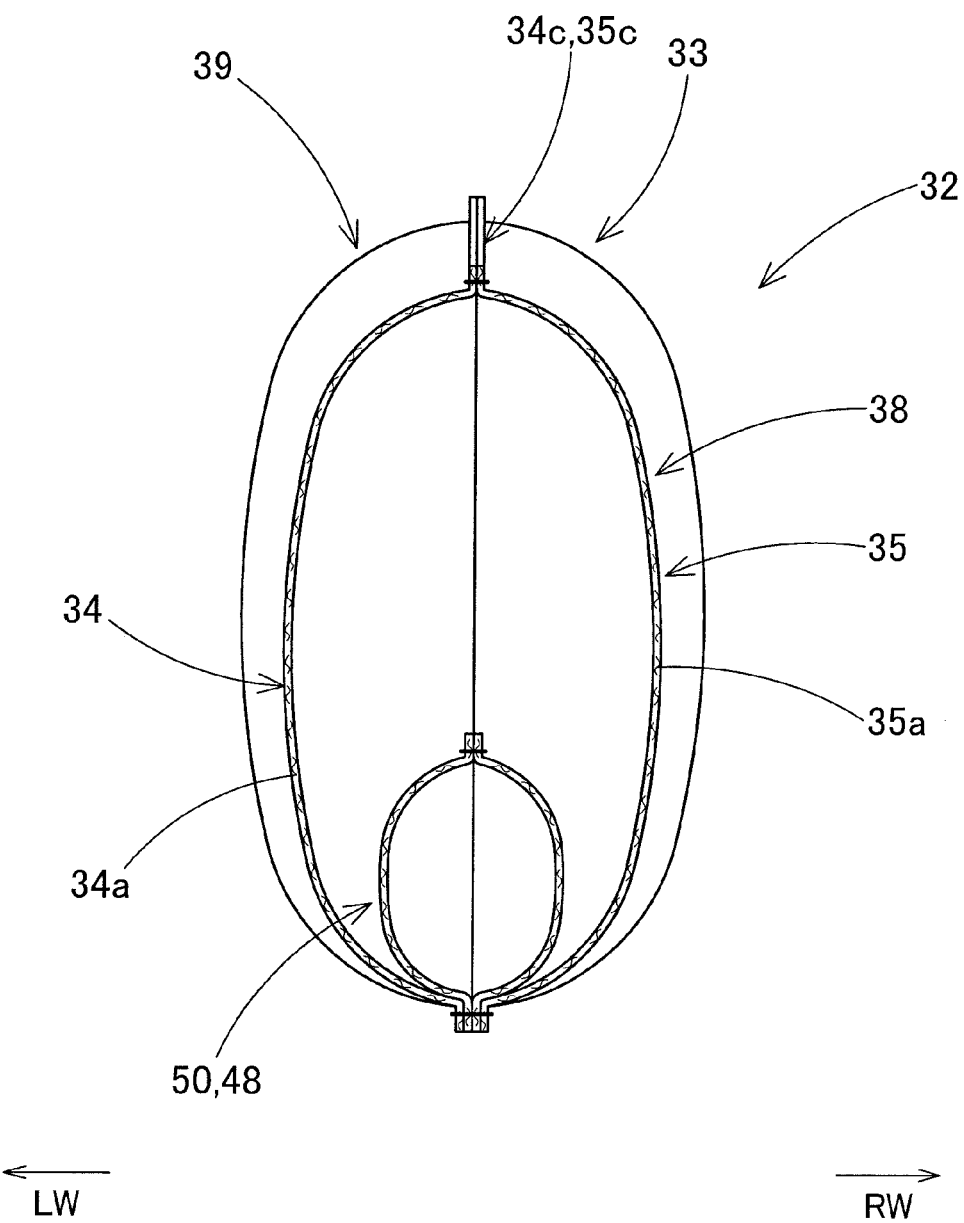
FIG. 6 is a sectional view of the airbag of FIG. 5 as is inflated by itself, corresponding to line VI-VI of FIG. 5.

As shown in FIGS. 5 and 6, the airbag 32 includes a bag body 33 inflatable with an inflation gas G fed from the inflator 26 and an inner tube 48 located inside the bag body 33.

Figure 7:
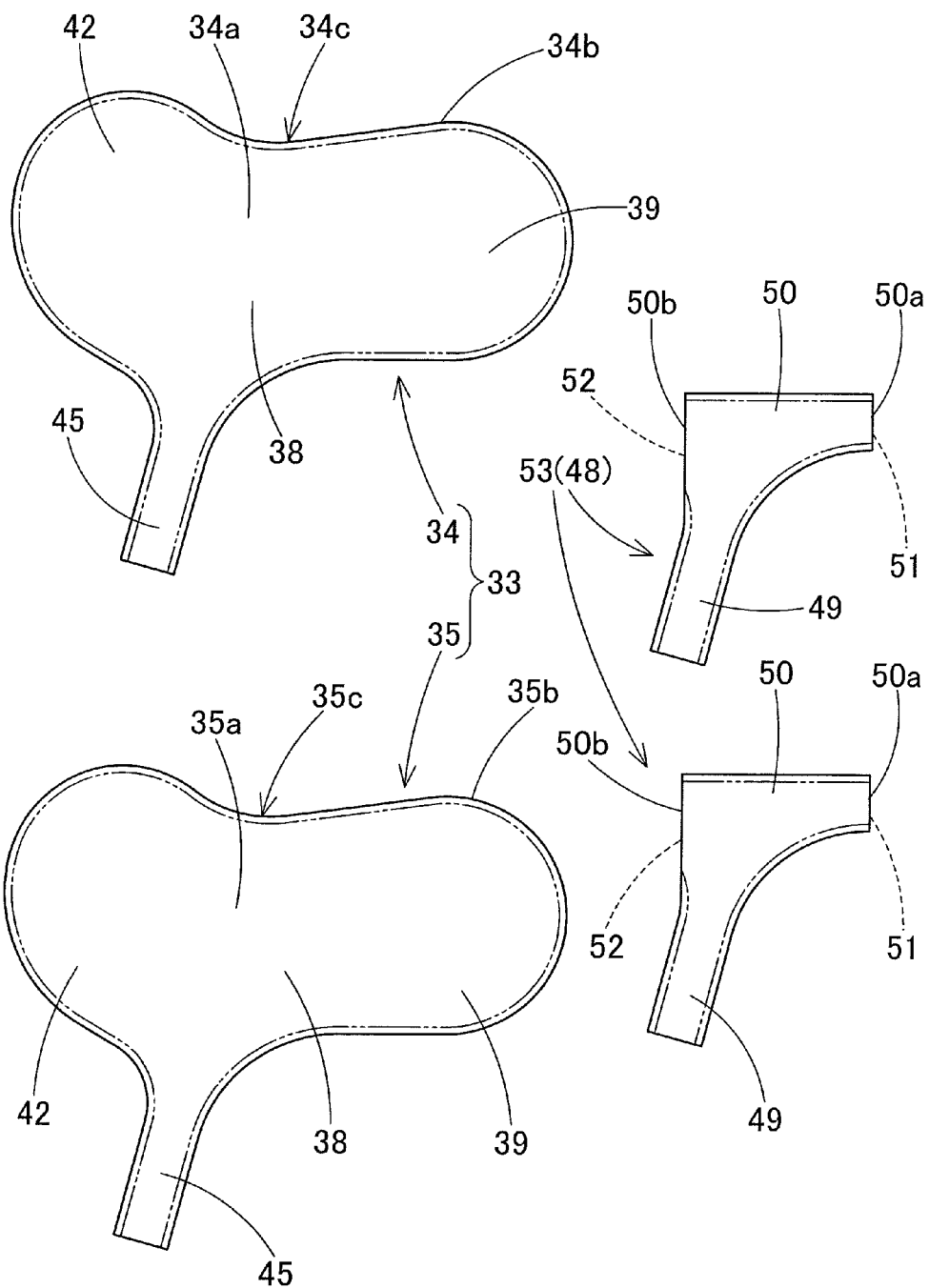
FIG. 7 illustrates base cloths of the airbag of FIG. 5 by plan views.

The bag body 33 is inflatable into a generally flat shape between the lap belt 17b, the shoulder belt 17a and an occupant MP at the right side of the front passenger seat PS while the occupant MP fastens the seatbelt device 15 in the passenger seat PS. As shown in FIGS. 5 to 7, the bag body 33 is formed into a bag by jointing (sewing) together outer circumferential edges of an occupant side wall 34 deployable immediately on a side of the occupant (i.e., on the left side LW) and an opposite side wall 35 deployable on a side facing away from the occupant MP (i.e., on the right side RW). The occupant side wall 34 and opposite side wall 35 are generally identical in outer contour. The bag body 33 of this specific embodiment is fabricated of a flexible woven fabric woven by polyamide yarn, polyester yarn or the like, which is coated by a coating agent such as silicone or the like.

Referring to FIGS. 5, 8 to 10, the bag body 33 includes a buckle covering section 38 deployable between the fastening area P and an occupant MP, a front inflatable section 39 so deployable as to extend forward from the buckle covering section 38, and a rear inflatable section 42 so deployable as to extend rear- and upwardly from the buckle covering section 38. That is, at airbag deployment, the front inflatable section 39 extends forward from the buckle covering section 38 located on an inner side of the fastening area P and the rear inflatable section 42 extends rearwardly from the buckle covering section 38 located on an inner side of the fastening area P. As shown in FIG. 5, when the bag body 33 is flattened with the occupant side wall 34 and opposite side wall 35 overlaid one above the other, it has a flat oval contour that has a slight dent at the upper edge in a vicinity of an intermediate region in a front and rear direction, and a rear region bent obliquely rear- and upwardly. That is, the bag body 33 approximates to a broad bean in outer contour. In an elongated shape in a front and rear direction of the bag body 33 as flattened, a front region constitutes the front inflatable section 39, a region located intermediately in a front and rear direction and dented at the upper edge constitutes the buckle covering section 38, and a rear region slanted rear- and upwardly constitutes the rear inflatable section 42. That is, intermediate regions 34a and 35a located midway in a front and rear direction of the occupant side wall 34 and opposite side wall 35, which constitute the buckle covering section 38, includes dents or depressed regions 34c and 35c, respectively, formed by denting the upper edges 34b and 35b downwardly (FIG. 7).

Figure 8:
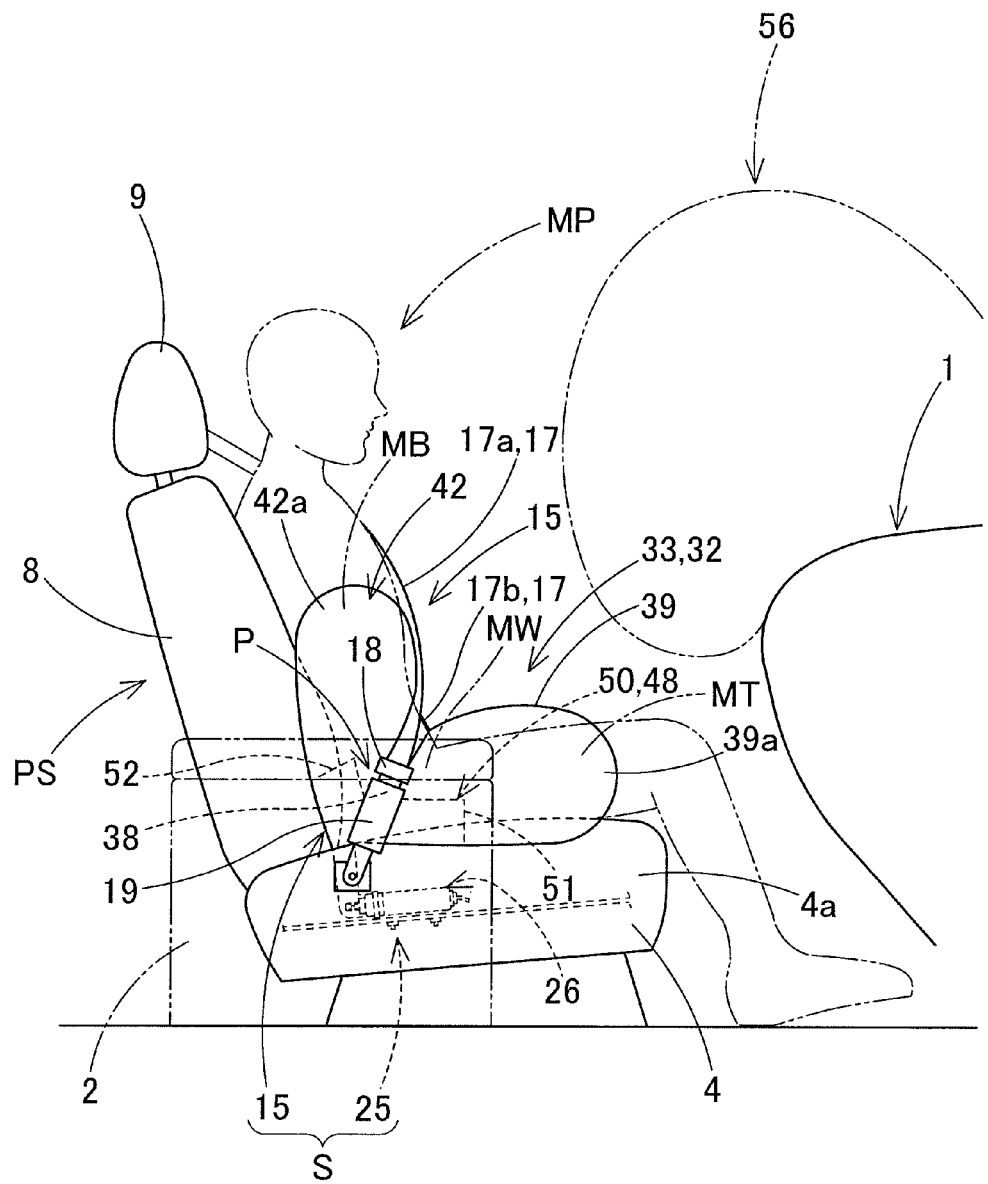
FIG. 8 is a schematic side view of the occupant protection system in operation, showing the airbag as fully inflated with a seatbelt fastened.

As shown in FIG. 8, at deployment of the airbag body 33, the front inflatable section 39 covers the right side of the pelvic area MW and the femoral region MT in the lower body of an occupant MP seated in the front passenger seat PS, and the rear inflatable section 42 covers the right side of the pelvic area MW and thorax MB in the upper body of the occupant MP. More specifically, the front inflatable section 38 is so designed as to inflate such that the front end 39a is located rearward relative to the front end 4a of the seat 4 and forward relative to the center in a front and rear direction of the seat 4, and the rear inflatable section 42 is so deployable that the upper end 42a is located at a vicinity of the center in an up and down direction of the backrest 8. Since the upper edges 34b and 35b of the occupant side wall 34 and opposite side wall 35 of the buckle covering section 38 are partially dented downwardly, the buckle covering section 38 is depressed relative to the front inflatable section 39 and rear inflatable section 42 at airbag inflation. That is, the buckle covering section 38 has a smaller sectional area than the front inflatable section 39 and rear inflatable section 42 at airbag inflation, as shown in FIG. 6.

Figure 11:
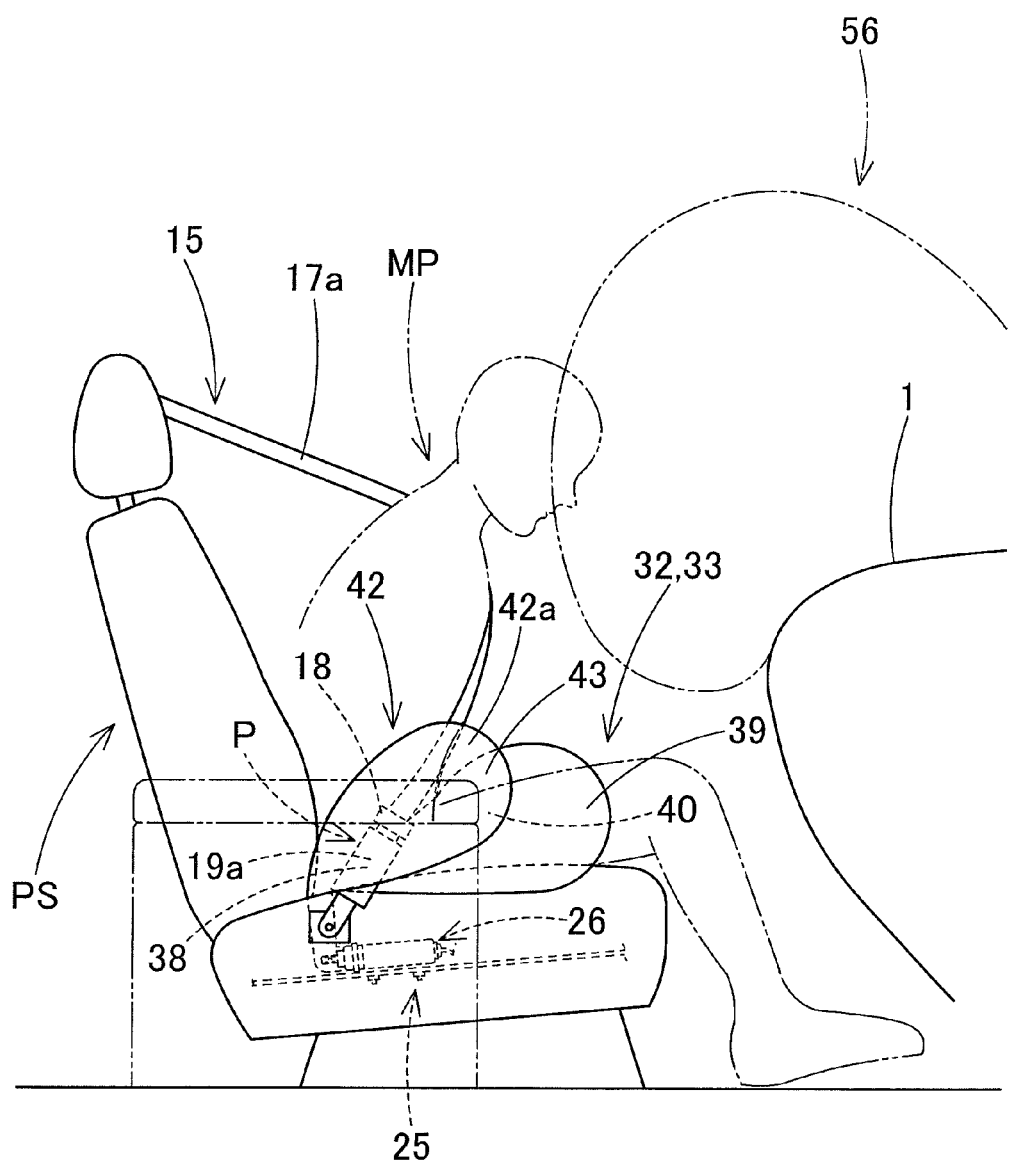
FIG. 11 is a schematic side view of the occupant protection system in operation, showing an occupant having moved forward after airbag deployment.
Figure 12:
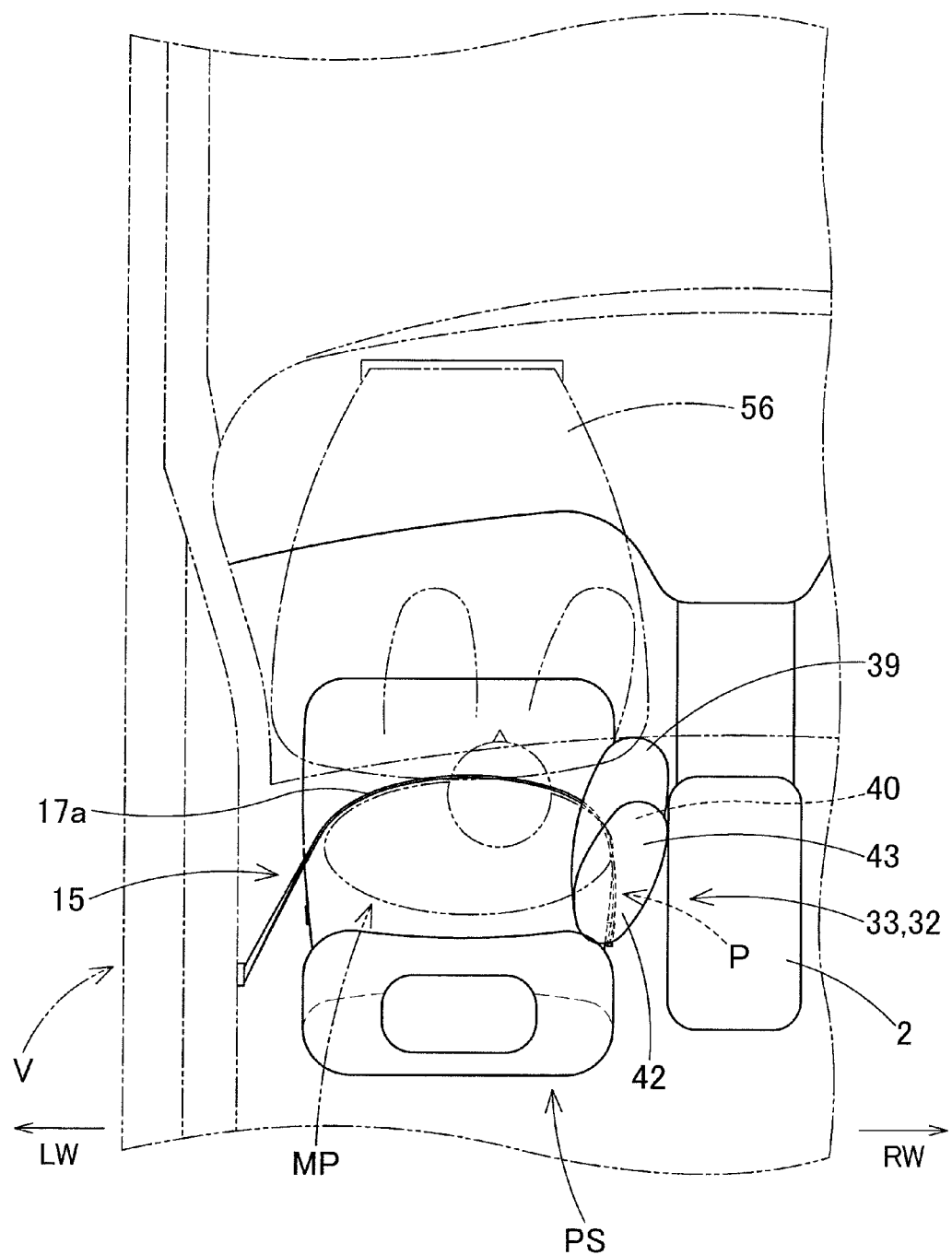
FIG. 12 is a schematic plan view of the occupant protection system in operation, showing the occupant having moved forward after airbag deployment.
Figure 13:
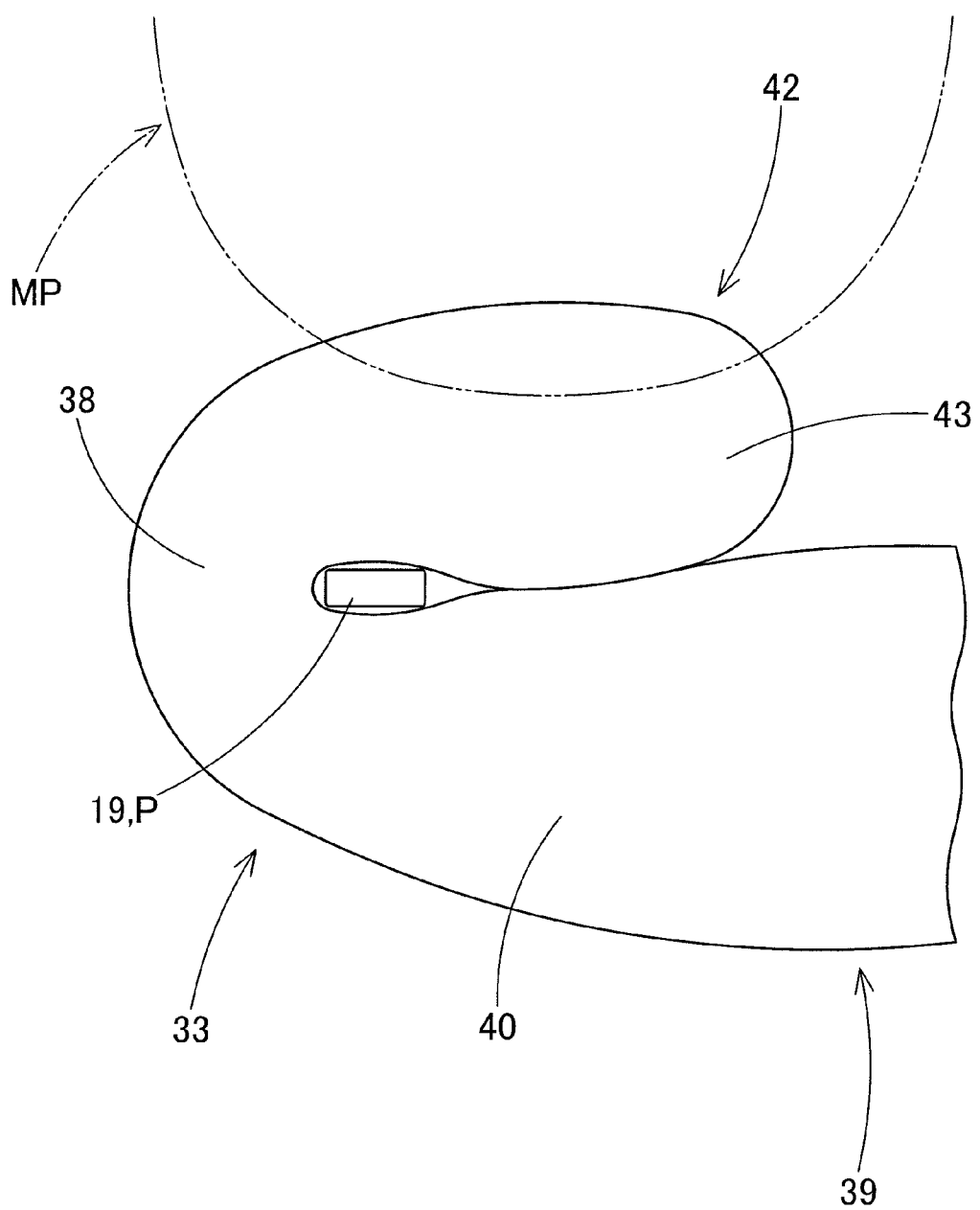
FIG. 13 schematically illustrates a state that a rear inflatable section of the airbag as has been fully inflated is supported by a front inflatable section while tucking the fastening area of the seatbelt device between itself and the front inflatable section.

If an occupant MP moves diagonally forward right in the event of a partial overlap frontal collision in which an impact force acts on a vehicle V from diagonally forward right, which is the direction where the buckle section 19 is located, the bag body 33 is designed to ride over a vicinity of the fastening area P such that the rear inflatable section 42, which is pushed by the occupant MP, contacts the right side of the front inflatable section 39 (FIGS. 11 to 13). More specifically, the length of the rear inflatable section 42 generally along its rear- and upwardly slanted axial direction is so determined that the leading end (i.e., upper end 42a) contacts the front inflatable section 39 when the bag body 33 is bent at a vicinity of the fastening area P. When the rear inflatable section 42 is folded back, the leading end (i.e., upper end 42a) of the rear inflatable section 42 serves as a contact region 43 which contacts with the front inflatable section 39. A rear area of the front inflatable section 39, which is proximate to the buckle covering section 38, serves as a support region 40 which supports the contact region 43 of the rear inflatable section 42 (FIGS. 11 to 13).

As shown in FIG. 5, the bag body 33 includes below the lower end of the buckle covering section 38 a tubular connection port 45 to be connected to the inflator 26. The connection port 45 protrudes diagonally rear- and downward from the bag body 33. The leading end 45a of the connection port 45 is so open as to receive the main body 27 of the inflator 26, and is connected with the main body 27 with a clamp 30 mounted around thereof.

Referring to FIGS. 5 and 6, the inner tube 48 located inside the bag body 33 includes a conduit section 49 that is located inside the connection port 45 for guiding an inflation gas G fed from the inflator 26 and a main body 50 that is located at the leading end of the conduit section 49 for bifurcating the gas G forward and rearward. The main body 50 is generally tubular in shape having openings at the front end and rear end, and is arranged generally along a front and rear direction at the lower end of the bag body 33 as inflated. More specifically, an inner diameter of the main body 50 is less than half of that of the buckle covering section 38 (in this specific embodiment, the inner diameter of the main body 50 is about one third of that of the buckle covering section 38). The main body 50 internally extends across the buckle covering section 38 and the fastening area P and the front end 50a and rear end 50b are located in areas of the front inflatable section 39 and rear inflatable section 42, respectively, so as to guide an inflation gas G fed from the inflator 26 to the front inflatable section 39 and rear inflatable section 42 from the front end 50a and rear end 50b via the buckle covering section 38 (FIG. 5). Even more specifically, the front end 50a and rear end 50b (i.e., an opening 51 and an opening 52) of the main body 50 are located away from the buckle covering section 38, forward and rearward. The conduit section 49 is formed into such a tube that lines a generally entire inner circumference of the connection port 45. As shown in FIG. 7, the inner tube 48 of this specific embodiment is comprised of a pair of materials 53 which are identical, flexible woven cloths. The materials 53 are jointed (sewn) together at upper edges of the regions for forming the main body 50, and then the lower edge of the main body 50 and front and rear edges of the conduit section 49 are sewn together with outer circumferential edges of the occupant side wall 34 and opposite side wall 35 of the bag body 33 when the bag body 33 is formed, thus the inner tube 48 is formed into a tube and is jointed to the bag body 33.

The vehicle V on which the occupant protection system S embodying the invention is intended to be mounted includes, at a lower region of an instrument panel or dashboard 1 in front of the front passenger seat PS, an airbag device 55 for a front passenger seat, as shown in FIG. 1. The airbag device 55 is actuated when an impact force acts on the front of the vehicle V. The airbag device 55 includes an airbag 56, which is folded up and stored on the underside of the dashboard 1, and an unillustrated inflator for feeding an inflation gas to the airbag 56, for inflating and covering the front of the front passenger seat PS in the event of a frontal collision including a partial overlap collision, as indicated by double-dotted lines in FIGS. 8 and 10.

Figure 10:
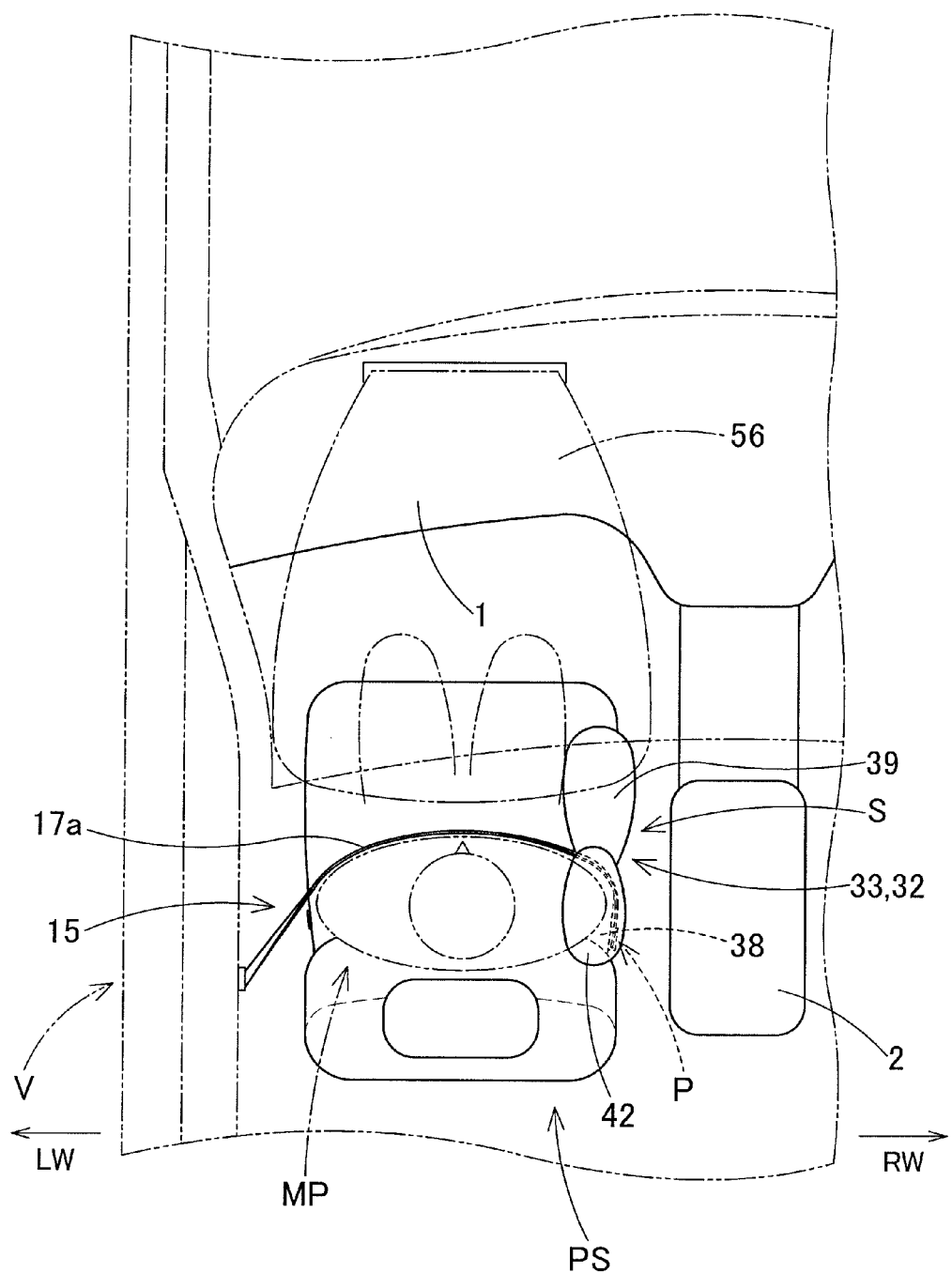
FIG. 10 is a schematic plan view of the occupant protection system in operation, showing the airbag as fully inflated with the seatbelt fastened.

In operation of the occupant protection system S, in the event of a lateral collision in which an object collides with the vehicle V on the right side RW or in a partially overlapping fashion on the right side of the vehicle front end, if an occupant MP seated in the front passenger seat PS wears the seatbelt, the pretensioner mechanism 21 of the seatbelt device 15 mounted on the front passenger seat PS is actuated and retracts the webbing 17 in response to an actuating signal from the actuating circuit as well as the inflator 26 of the airbag device 25 is actuated. The airbag 32 then inflates with an inflation gas and is deployed between the lap belt 17b, the shoulder belt 17a of the seatbelt device 15 and the occupant MP and covers him/her on the right side RW, as shown in FIGS. 8 to 10. In an instance where the object collides from the diagonally forward right direction, the airbag device 55 mounted in front of the passenger seat PS is simultaneously actuated to inflate the airbag 56, as indicated by double-dotted lines in FIGS. 8 and 10.

In the occupant protection system S of the embodiment, the airbag 32 of the airbag device 25 is deployable between the lap belt 17b, the shoulder belt 17a of the seatbelt device 15 and an occupant MP seated in the front passenger seat PS. The buckle section 19 of the seatbelt device 15 buckles the tongue 18 at the fastening area P. The airbag 32 includes the front inflatable section 39 that is so deployable as to extend forward from a vicinity of the fastening area P at an inner side of the fastening area P and the rear inflatable section 42 that is so deployable as to extend rear- and upwardly from a vicinity of the fastening area P at an inner side of the fastening area P. If the occupant MP moves diagonally forward right in the event of a partial overlap frontal collision in which an impact force acts on the vehicle V from diagonally forward right, i.e., from the front of the buckle section 19, the rear inflatable section 42 is pushed forward along with the forward movement of the occupant MP, as shown in FIGS. 11 and 12. With the occupant protection system S, the rear inflatable section 42 then rides over the vicinity of the fastening area P and contacts the front inflatable section 39, as shown in FIG. 13. That is, the rear inflatable section 42 having cushioned the upper body of the occupant MP laps over the front inflatable section 39 while tucking the fastening area P between the rear inflatable section 42 and front inflatable section 39, and consequently, the airbag 32 (bag body 33) will be prevented from slipping out of the fastening area P. Moreover, when the rear inflatable section 42 overlaps the front inflatable section 39, the contact region 43 of the rear inflatable section 42 is supported by the support region 40 of the front inflatable section 39 as shown in FIGS. 11 to 13, and the airbag 32 accordingly increases its thickness, by the doubled front inflatable section 39 and rear inflatable section 42. Thus the airbag 32 will adequately arrest the pelvic area MW of the occupant MP, and prevent the occupant MP from moving further forward. As a result, the occupant protection system S of the embodiment will prevent the occupant MP from substantially moving diagonally forward right and prevent him/her from slipping out of the shoulder belt 17*a* which extends left- and upward (i.e., toward an outboard direction) from the buckle section 19 located proximate to the seat 4.

Therefore, the occupant protection system S of the embodiment will be capable of protecting an occupant MP adequately with the airbag 32 in the event of a partial overlap frontal collision in which an impact force acts on a vehicle from the front (from the diagonally forward right direction) of the buckle section 19 of the seatbelt device 15.

Further, at a partial overlap frontal collision at the right front part of a vehicle, the airbag 56 of the airbag device 55 mounted in front of the front passenger seat PS is actuated and inflated as well, as indicated by double-dotted lines in FIG. 8. Therefore, in a vehicle V equipped with the occupant protection system S, an occupant MP will not only be suppressed from moving toward the right RW by the airbag 32 and arrested by the seatbelt device 15, but also be adequately cushioned by the airbag 56 deployed in front of the front passenger seat PS, as indicated by double-dotted lines in FIG. 12.

Moreover, in the occupant protection system S, with the front inflatable section 39 that is so deployable as to extend forward from a vicinity of the fastening area P and the rear inflatable section 42 that is so deployable as to extend rear- and upwardly from a vicinity of the fastening area P, the airbag 32 (bag body 33) covers the right side RW of an occupant MP seated in the front passenger seat PS extensively at deployment, as shown in FIG. 8. In the event of a lateral collision in which an impact force acts on the right side of a vehicle V, therefore, the airbag 32 will prevent the occupant MP from being engaged with a member of the vehicle such as a console box 2 (FIGS. 8 to 10) located on the right side RW of the occupant MP and next to the driver seat DS, thus protecting the occupant MP adequately.

Furthermore, the occupant protection system S further includes the inner tube 48 that is located inside the airbag 32 (bag body 33) and guides an inflation gas G fed from the inflator 26 to the front inflatable section 39 and rear inflatable section 42*a* via a region of the airbag 32 behind a vicinity of the fastening area P. This inner tube 48 will help inflate the front inflatable section 39 and rear inflatable section 42 quickly and will consequently help deploy the airbag 32 between the lap belt 17*b*, shoulder belt 17*a* and an occupant MP extensively and quickly. Especially, the occupant protection system S is so designed that the start of actuation of the inflator 26 occurs slightly after the start of actuation of the pretensioner mechanism 21 of the seatbelt device 15 such that the inflator 26 is actuated after the pretensioner mechanism 21 has started to retract the webbing 17. With this configuration, a clearance between the lap belt 17*b*, shoulder belt 17*a* and an occupant MP will be considerably narrow. However, the inner tube 48 inside the bag body 33 will be deployed into the narrow clearance and help feed an inflation gas G smoothly into the front inflatable section 39 and rear inflatable section 42 via the front and rear openings 51 and 52 located away from the fastening area P (i.e., from the lap belt 17*b*, shoulder belt 17*a* and buckle section 19), as shown in FIG. 8. Therefore, the occupant protection system S will be capable of inflating the airbag 32 adequately even if a clearance between the fastening area P (the lap belt 17*b*, shoulder belt 17*a* and buckle section 19) and an occupant MP is narrow because of operation of the pretensioner mechanism 21. Without considering such an advantage, the airbag may be provided without the inner tube.

The occupant protection system S is so designed that the start of actuation of the inflator 26 occurs slightly after the start of actuation of the pretensioner mechanism 21 of the seatbelt device 15. This configuration will help prevent the webbing 17 from being pushed by the airbag 32 as is inflating and unreeled, since the airbag 32 starts to inflate after the pretensioner mechanism 21 has retracted the webbing 17 to some extent. Further, with this configuration, the airbag 32 will be inflated into a predetermined contour in a state where the lap belt 17*b* of the seatbelt device 15 has been brought into contact with the pelvic area MW of an occupant MP, not that the lap belt is pulled into contact with the pelvic area over the airbag as has been inflated. As a consequence, the lap belt 17*b* will be prevented from being lifted away from the pelvic area MW of the occupant MP by the airbag 32 (bag body 33) as has been inflated, thus a large gap will not be formed between the lap belt 17*b* and the occupant MR. If such an advantage does not have to be considered, the inflator may be configured as to be actuated generally simultaneously with or prior to the pretensioner mechanism.

In the occupant protection system S, the buckle covering section 38 of the airbag 32 (bag body 33), which is deployable between a vicinity of the fastening area P and an occupant MP, is so configured as to be depressed relative to its forward and rearward regions, i.e., relative to the front inflatable section 39 and rear inflatable section 42, at airbag deployment. This configuration reduces the sectional area of the buckle covering section 38 as inflated, and accordingly will further prevent the airbag 32 from lifting the lap belt 17*b*. Further, this configuration will facilitate the bending of the airbag 32 about the buckle covering section 38 such that the rear inflatable section 42 laps over the front inflatable section 39, when the rear inflatable section 42 contacts the front inflatable section 39.

In the occupant protection system S, specifically, the occupant side wall 34 and opposite side wall 35 of the bag body 33 have dents 34*c* and 35*c* at the upper edges 34*b* and 35*b* of the intermediate regions 34*a* and 35*a*, i.e., at the buckle covering sections 38, such that the buckle covering section 38 of the airbag 32 as fully inflated is reduced in dimension in an up and down direction and in sectional area relative to its forward and rearward regions, i.e., the front inflatable section 39 and rear inflatable section 42.

Figure 14:
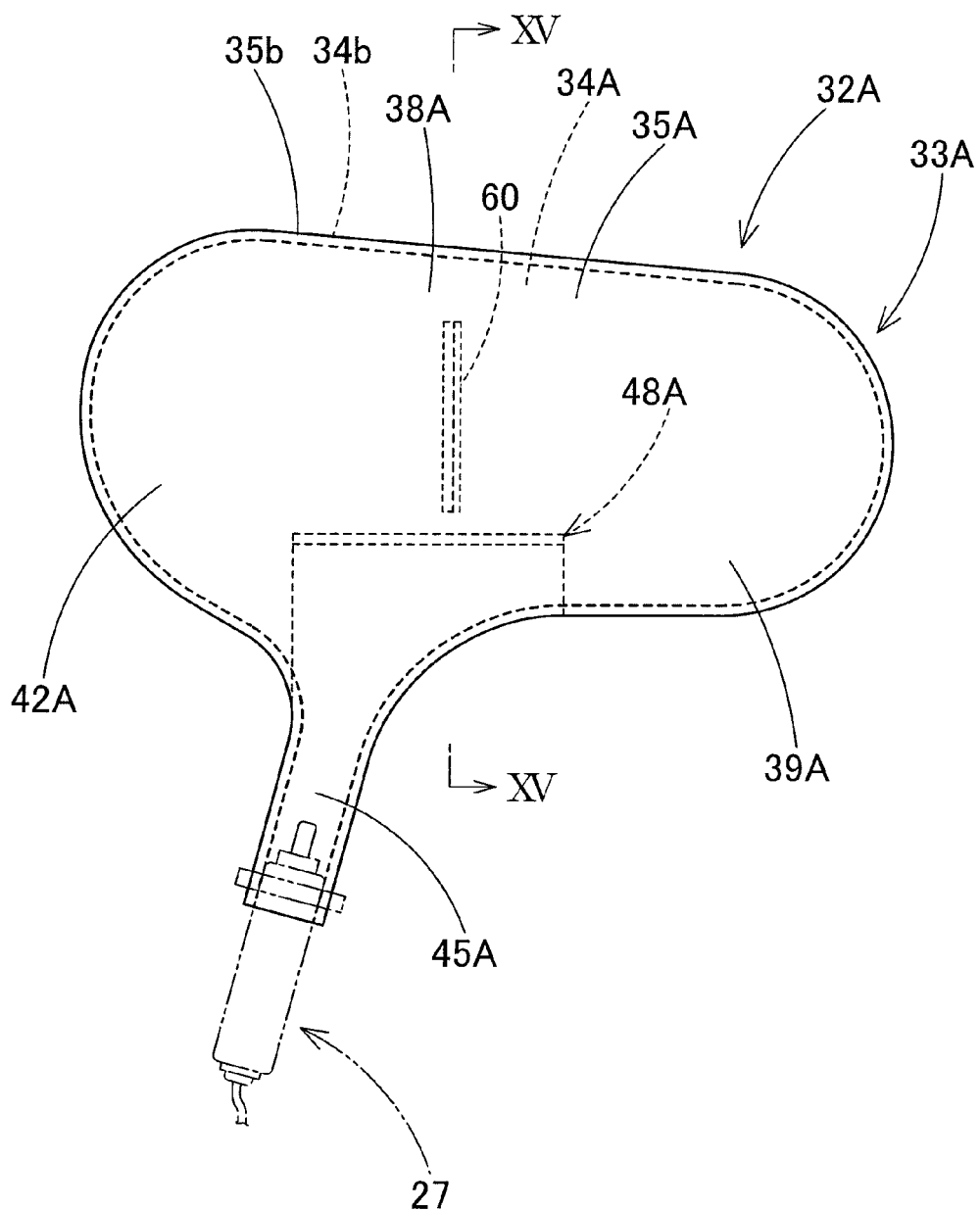
FIG. 14 is a side view of an alternative embodiment of the airbag.
Figure 15:
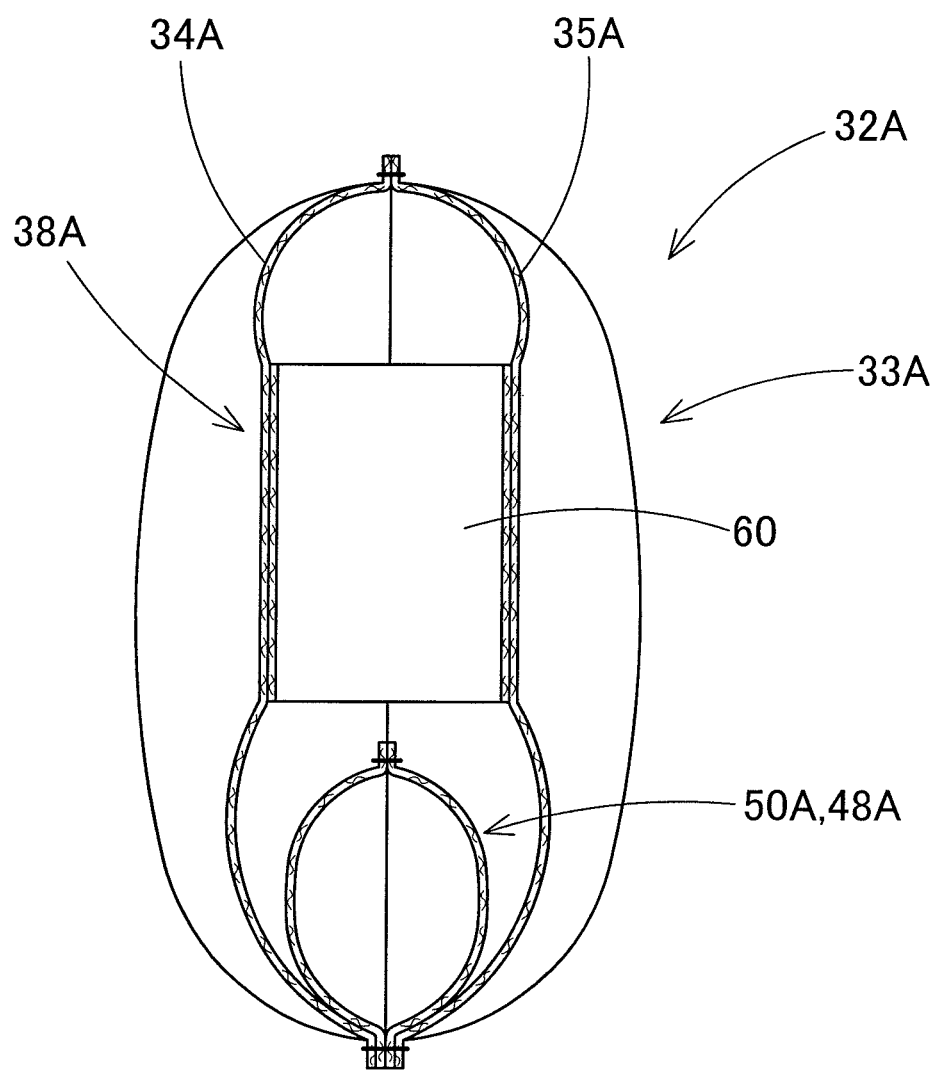
FIG. 15 is a sectional view of the airbag of FIG. 14 as is inflated by itself, corresponding to line XV-XV of FIG. 14.

FIGS. 14 and 15 depict an alternative embodiment of the airbag of the invention, an airbag 32A, which is internally provided with a tether 60 connecting an occupant side wall 34A and opposite side wall 35A to limit the clearance there between. The airbag 32A has a similar configuration to the airbag 32 of the foregoing embodiment except in outer contour of the occupant side wall 34A and opposite side wall 35A and in including the tether 60, and therefore, detailed descriptions of common members will be omitted and the common members will be assigned "A" at the end of common reference numerals. The occupant side wall 34A and opposite side wall 35A, which constitute a bag body 33A, are identical in outer contour. Unlike the occupant side wall 34 and opposite side wall 35 of the airbag 32 in the foregoing embodiment, the upper edges 34*b* and 35*b* of the occupant side wall 34A and opposite side wall 35A are generally straight. The bag body 33A includes at the buckle covering section 38A a tether 60. The tether 60 is formed of a band-shaped flexible sheet material and connects the occupant side wall 34A and opposite side wall 35A. The tether 60 serves to limit the clearance between the occupant side wall 34A and opposite side wall 35A at airbag inflation such that the buckle covering section 38A is thinner than the front inflatable section 39A and rear inflatable section 42A at airbag inflation. In the illustrated embodiment, the tether 60 is arranged along a generally up and down direction above the inner tube 48A in the buckle covering section 38A. With this configuration, the buckle covering section 38A will be reduced in thickness and sectional area at airbag inflation relative to its forward and rearward regions, i.e., the front inflatable section 39A and rear inflatable section 42A.

Although the foregoing embodiments have been described as is mounted on a front passenger seat, the occupant protection system according to the present invention can also be mounted on a driver's seat.

Although the airbag of the airbag device in the foregoing embodiments has been described as is stored in a vicinity of a buckle section of a seat of a front passenger seat, the location of airbag storage should not be limited thereby. The airbag may also be stored in a buckle section itself. Further, although the seatbelt device in the foregoing embodiments is a three-point belt device, the configuration of the seatbelt device applicable to the invention should not be limited thereby. On condition that a seatbelt is fastened to a buckle section at midway between a shoulder belt and a lap belt, a four-point belt device may also be used.

What is claimed is:

1. A protection system comprising:
   a seatbelt device mountable on a seat of a vehicle, comprising a lap belt, a shoulder belt, a tongue and a buckle section that buckles the tongue;
   an airbag device mountable in a vicinity of a fastening area of the seatbelt device on the seat, at which fastening area the buckle section of the seatbelt device buckles the tongue; and
   an airbag of the airbag device inflatable with an inflation gas fed from an inflator and deployable under the lap belt and the shoulder belt of the seatbelt device when in use, the airbag comprising
      a front inflatable section that is so deployable as to extend forward from the vicinity of the fastening area and
      a rear inflatable section that is so deployable as to extend rearwardly and upwardly from the vicinity of the fastening area,
      the rear inflatable section being so configured as to ride over the fastening area and contact the front inflatable section such that a contact region of the rear inflatable section contacts and is supported by a support region of the front inflatable section, when an impact force acts in a diagonal direction from the front of the buckle section resulting in the rear inflatable section being pushed forward.

2. The protection system of claim 1, further comprising an inner tube that is located inside the airbag and guides the inflation gas fed from the inflator to the front inflatable section and rear inflatable section via a region of the airbag behind the vicinity of the fastening area.

3. The protection system of claim 1, wherein the seatbelt device comprises a pretensioner mechanism and a start of actuation of the inflator occurs after a start of actuation of the pretensioner mechanism.

4. The protection system of claim 1, wherein a buckle covering section of the airbag is so configured as to be depressed relative to forward and rearward inflatable regions thereof in the airbag at airbag deployment.

5. The protection system of claim 4, wherein the airbag comprises:
   a side wall and opposite side wall, which are generally identical in outer contour and jointed together by outer circumferential edges thereof to form the airbag; and
   a dent that is formed at an outer circumferential edge of each of the side wall and opposite side wall for forming a depressed contour of the buckle covering section.

6. The protection system of claim 4, wherein the airbag comprises:
   a side wall and opposite side wall, which are jointed together by outer circumferential edges thereof to form the airbag; and
   a tether that is located inside the airbag, which limits a clearance between the side wall and the opposite side wall for forming a depressed contour of the buckle covering section.

* * * * *